(12) United States Patent
Cirot et al.

(10) Patent No.: US 7,286,183 B2
(45) Date of Patent: Oct. 23, 2007

(54) DEVICE FOR GENERATING A VIDEO IMAGE SHARPNESS IMPROVEMENT SIGNAL

(75) Inventors: Eric Cirot, Grenoble (FR); Michel Barou, Voreppe (FR); Danika Chaussy, Brie Et Angonnes (FR)

(73) Assignee: STMicroelectronics S.A., Montrouge (FR)

(*) Notice: Subject to any disclaimer, the term of this patent is extended or adjusted under 35 U.S.C. 154(b) by 500 days.

(21) Appl. No.: 10/926,786

(22) Filed: Aug. 26, 2004

(65) Prior Publication Data

US 2005/0078054 A1 Apr. 14, 2005

(30) Foreign Application Priority Data

Aug. 29, 2003 (FR) .................................. 03 10326

(51) Int. Cl.
*H04N 5/00* (2006.01)
*H04N 5/14* (2006.01)
*H04N 5/68* (2006.01)
*G09G 5/00* (2006.01)
*G09G 5/02* (2006.01)

(52) U.S. Cl. ...................... 348/379; 348/607; 348/673; 345/590; 345/620

(58) Field of Classification Search ................ 348/379, 348/607, 625, 673; 345/590, 620
See application file for complete search history.

(56) References Cited

U.S. PATENT DOCUMENTS

| 4,275,417 A | 6/1981 | Esashika ...................... 358/162 |
| 5,920,351 A * | 7/1999 | Takeshima et al. ......... 348/379 |
| 6,069,660 A * | 5/2000 | Sato ........................... 348/379 |
| 6,404,460 B1 | 6/2002 | Chen et al. .................. 348/606 |
| 7,027,098 B2 * | 4/2006 | Gai et al. .................... 348/379 |
| 2005/0157212 A1 * | 7/2005 | Miura et al. ................. 348/379 |

FOREIGN PATENT DOCUMENTS

| FR | 2 729 524 | 7/1996 |
| JP | 63-146666 | 6/1988 |

OTHER PUBLICATIONS

Tietze, S., "Differenzverstärker mit Stromgegenkopplung," Halbleiter-Schaltungstechnik, pp. 64-65, 1980. XP002273413.

* cited by examiner

*Primary Examiner*—Brian P. Yenke
(74) *Attorney, Agent, or Firm*—Lisa K. Jorgenson; David V. Carlson; Seed IP Law Group PLLC

(57) ABSTRACT

A device for producing a video image sharpness improvement signal (DOC21-DOC22), with black level clipping of an associated video signal, comprises a differential transconductance stage processing the video signal and whose bias currents (Imax) are directly proportional to the active component (ΔV) of the video signal so as to bring about a black level sharpness improvement signal clipping.

20 Claims, 9 Drawing Sheets

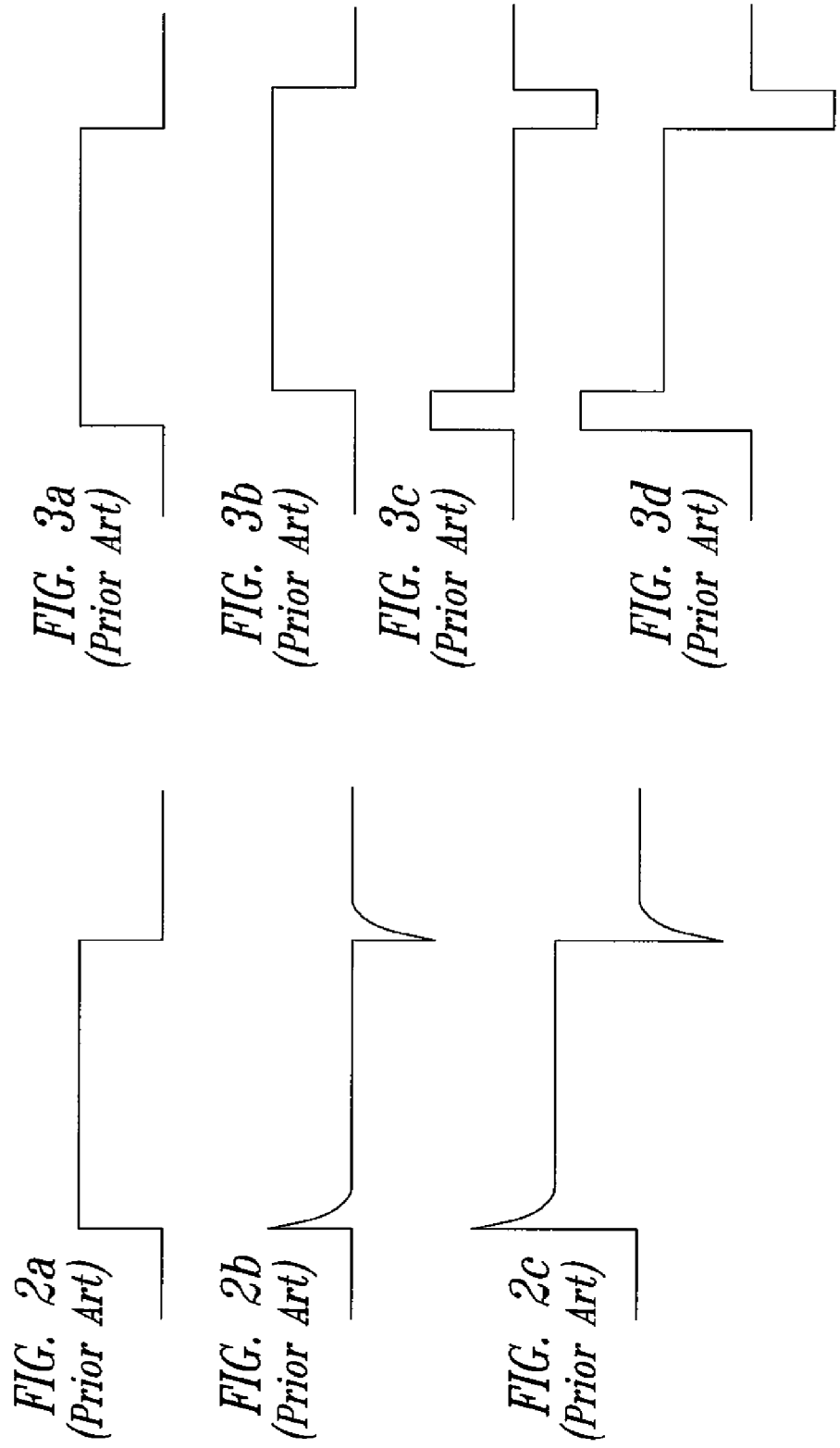

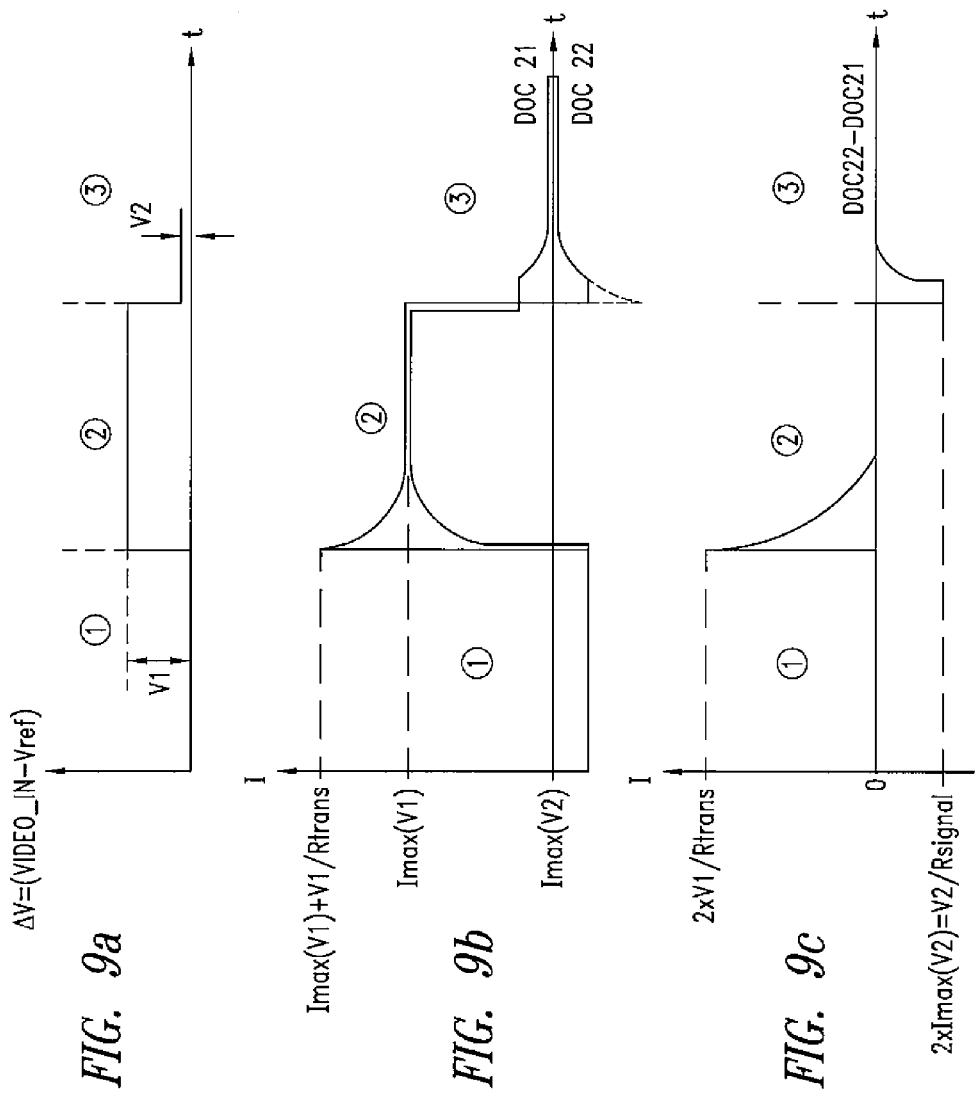

DEVICE FOR GENERATING A VIDEO IMAGE SHARPNESS IMPROVEMENT SIGNAL

FIELD OF THE INVENTION

The present invention relates to a device for generating a video image sharpness improvement signal, and more generally to the implementation of a sharpness improvement function and of a black level clipping function.

It pertains to the field of the displaying of still or moving images on the screen of a television or of a computer monitor, whether the screen be a cathode ray tube or CRT screen, a liquid crystal display or LCD, a plasma screen, or the like.

The invention is described hereinbelow in the case of a CRT screen, although this is not limiting. For such a screen, the invention may for example be implemented in the video preamplifier associated with the screen.

BACKGROUND OF THE INVENTION

Figures 1A, 1B:
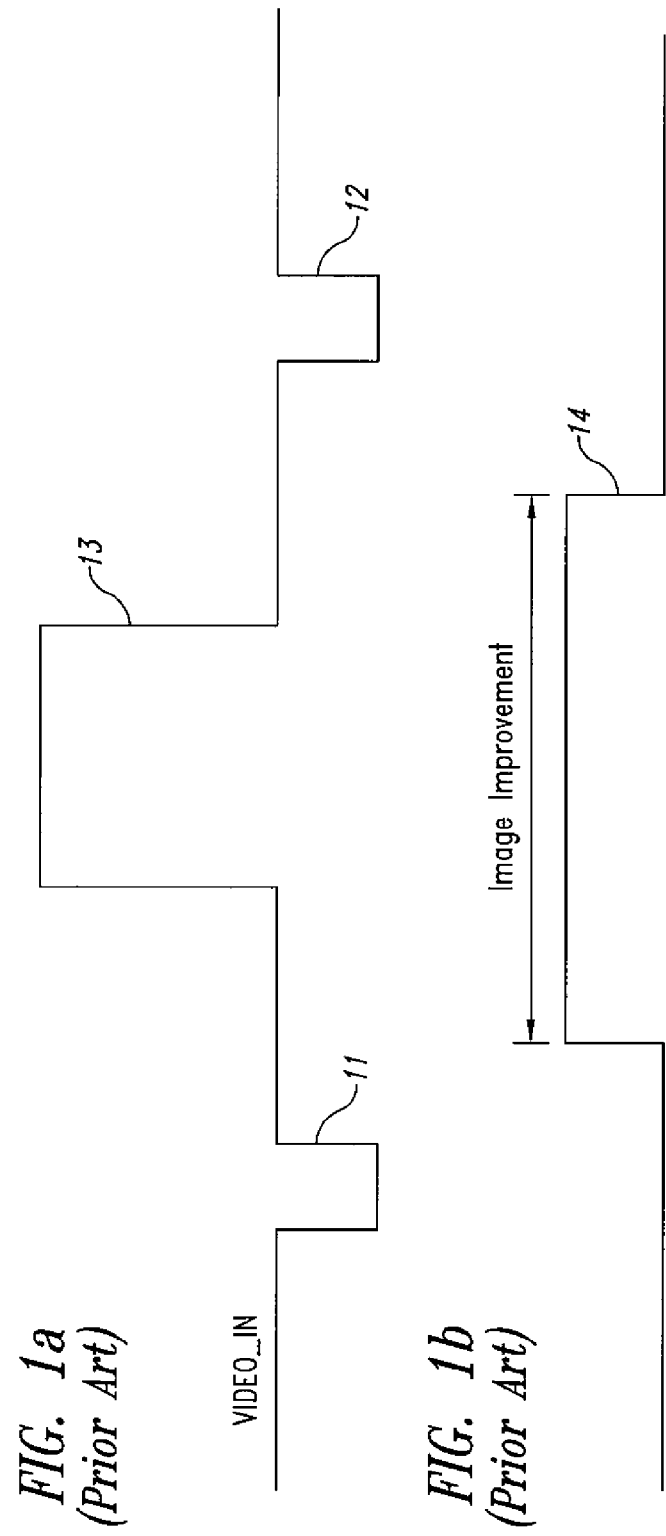

Represented diagrammatically in FIG. 1a is a portion of an input video signal VIDEO_IN, corresponding to the displaying of an image line on the screen. This portion lies between two line-blanking intervals 11 and 12 designed for the flyback of the beam deflection armatures of the cathode ray tube. For the sake of simplicity, the video signal is considered to exhibit the form of a rectangular voltage pulse 13 inside the video signal portion considered.

Represented in FIG. 1b is an image improvement control signal PBC. This signal is synchronized with the signal VIDEO_IN. For example, the signal PBC is at the high level when the image is to be improved, and at the low level otherwise. In the example shown in the figure, the image is thus improved within a zone situated substantially at the centre of the line which corresponds to the portion of the signal VIDEO_IN between the intervals 11 and 12. This zone corresponds to a rectangular pulse 14 of the signal PBC.

Figure 1C:
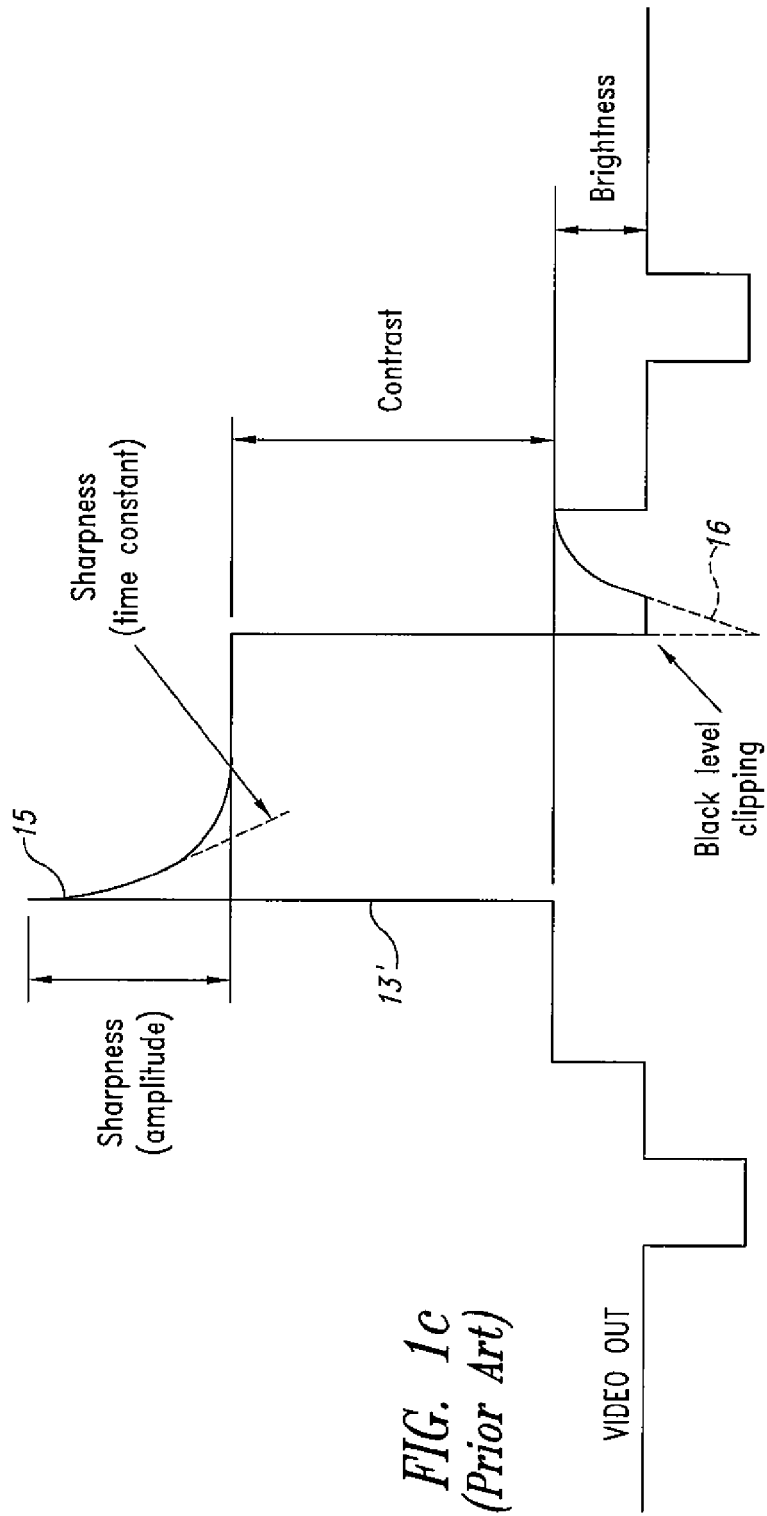

Represented in FIG. 1c is a signal VIDEO_OUT at the output of a circuit which receives the signal VIDEO_IN as input, and which implements the image improvement functions. In the example considered here, this circuit is for example the screen's video preamplifier.

Outside the improved zone of the image, the signal VIDEO_OUT corresponds to the signal VIDEO_IN. Inside this zone, however, a pulse 13' corresponding in the signal VIDEO_OUT to the pulse 13 in the signal VIDEO_IN differs from said pulse through the following characteristics:

the low level of the pulse 13' is higher than that of the pulse 13, this resulting from the image brightness improvement function;

the difference between the high level and the low level of the pulse 13' is higher than for the pulse 13, this resulting from the image contrast improvement function;

the pulse 13' exhibits a positive peak 15 (an overvoltage) subsequent to its rising edge and a negative peak 16 subsequent to its falling edge, which result from the image sharpness (vivacity) improvement function. In the example represented, these peaks have exponential decay; and the positive peak 16 of the pulse 13' is clipped at the minimum level of the signal VIDEO_IN, this resulting from the black level clipping function.

The positive peak 15 participates in the sought-after sharpness improvement, which is dependent both on the amplitude and on the time constant of the peak 15. This is why it is also referred to as the "sharpness peak" in the jargon of the person skilled in the art and in what follows. The negative peak 16 also participates in the sharpness improvement. As is known in the state of the art, the negative peak 16 is nevertheless clipped at the black level, which corresponds to a zero value of the active component of the signal VIDEO_IN, so as not to disturb the operation of the display system.

In the state of the art, various ways of carrying out the sharpness improvement function are known. Apart from the entirely digital methods, methods involving differentiation of the input video signal and methods using a delay line are thus known.

The time charts of FIGS. 2a to 2c illustrate the principle of the methods involving differentiation of the signal VIDEO_IN. For simplicity, the signal VIDEO_IN (FIG. 2a) considered here is a rectangular pulse. By differentiation, one firstly obtains the differentiated signal VIDEO_IN (FIG. 2b), which exhibits a positive peak and a negative peak subsequent respectively to the rising edge and to the falling edge of the signal VIDEO_IN. Next by adding the signal VIDEO_IN and the differentiated signal VIDEO_IN, one obtains the output video signal VIDEO_OUT (FIG. 2c).

The time charts of FIGS. 3a to 3d illustrate the principle of the methods using a delay line. For simplicity, the signal VIDEO_IN (FIG. 3a) considered here is also a rectangular pulse. By passing the signal VIDEO_IN through a delay line, one firstly obtains the delayed signal VIDEO_IN (FIG. 3b). Next by differencing the signal VIDEO_IN and the delayed signal VIDEO_IN, one obtains a signal (FIG. 3c) comprising a positive peak and a negative peak subsequent respectively to the rising edge and to the falling edge of the signal VIDEO_IN. Then by adding this signal to the signal VIDEO_IN, one obtains the signal VIDEO_OUT (FIG. 3d).

However, the known implementations of these techniques by differentiation or by delay lines are not satisfactory in that they do not allow easy adjustment of the amplitude and of the time constant of the sharpness peak, and/or do not allow black level clipping, and/or are expensive to implement (in particular in the case of delay line techniques).

BRIEF SUMMARY OF THE INVENTION

An object of the invention consists in proposing an original solution for simultaneously implementing the sharpness improvement function and black level clipping function.

This aim is achieved, according to a first aspect of the invention, by virtue of a device for producing a sharpness improvement signal for a video image with black level clipping of an associated video signal, said device comprising:

a first differential transconductance stage comprising:

a voltage input for receiving the video signal, said video signal comprising a determined fixed component which corresponds to the black level and a variable active component;

a differential pair with a first transistor having a control terminal coupled to the voltage input, and a second transistor having a control terminal coupled to the voltage input via an integrator;

a first controlled current source coupled to a first main terminal of the first transistor and a second controlled current source coupled to a first main terminal of the second transistor, said first current source and said second current source each delivering one and the same variable bias current, a resistor connected between said first respective main terminals of the first and of the second transistor;

a first current output coupled to a second main terminal of the first transistor and a second current output coupled to a second main terminal of the second transistor, the sharpness improvement signal being the differential current signal between said first and second current outputs; and means for producing a control signal for the first and for the second current source, in such a way that the bias currents are directly proportional to the active component of the video signal.

Such a sharpness improvement signal is intended to be added to the video signal. The maximum amplitude of the sharpness peak is determined by the value of the resistor. Its time constant is determined by the integrator circuit. Furthermore, as will be more clearly apparent in what follows, the fact that the bias currents of the transconductance stage are directly proportional to the active component of the video signal brings about a clipping of the sharpness improvement signal at the black level.

It will noted that the sign of the differential current between the first and second current outputs of the first differential transconductance stage is immaterial, this being manifested by the symmetry between the positive peak 15 and the negative peak 16 (FIG. 1*c*).

A second aspect of the invention pertains to a video preamplification circuit comprising a device according to the first aspect.

BRIEF DESCRIPTION OF THE SEVERAL VIEWS OF THE DRAWING(S)

Figure 4:
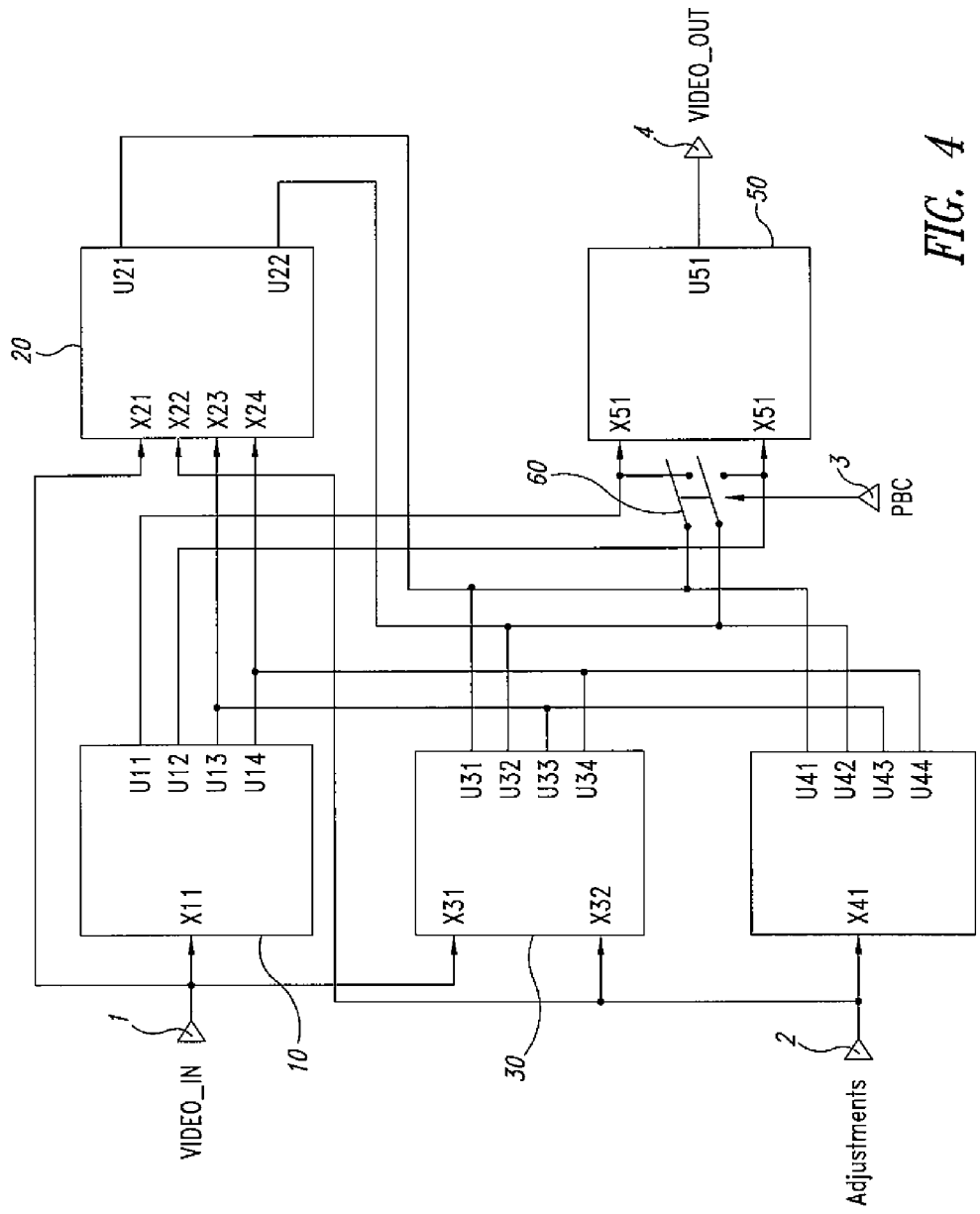
Figure 6:
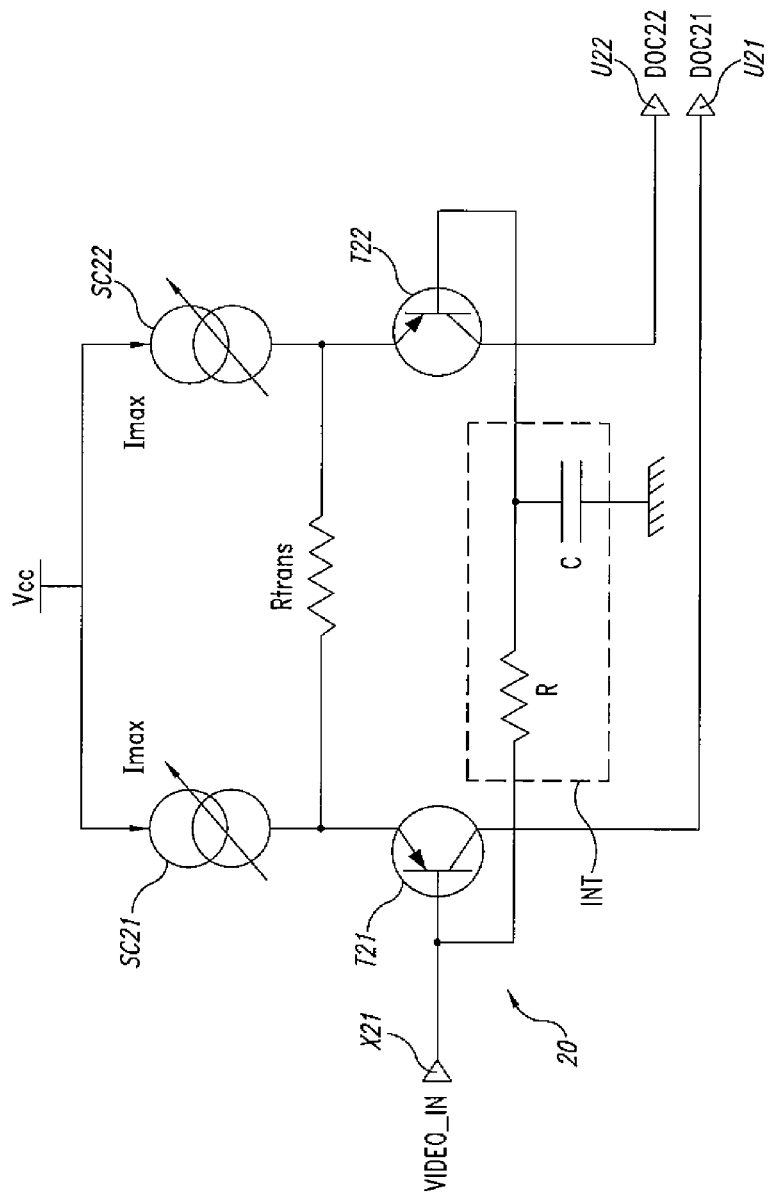
Figure 7:
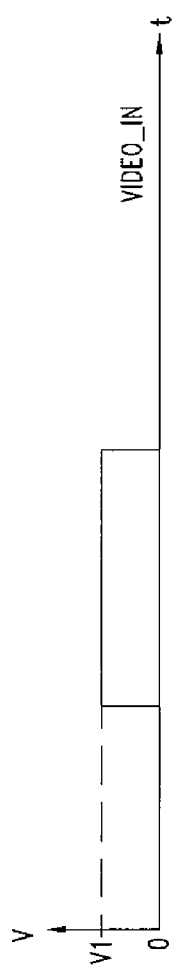
Figure 8:
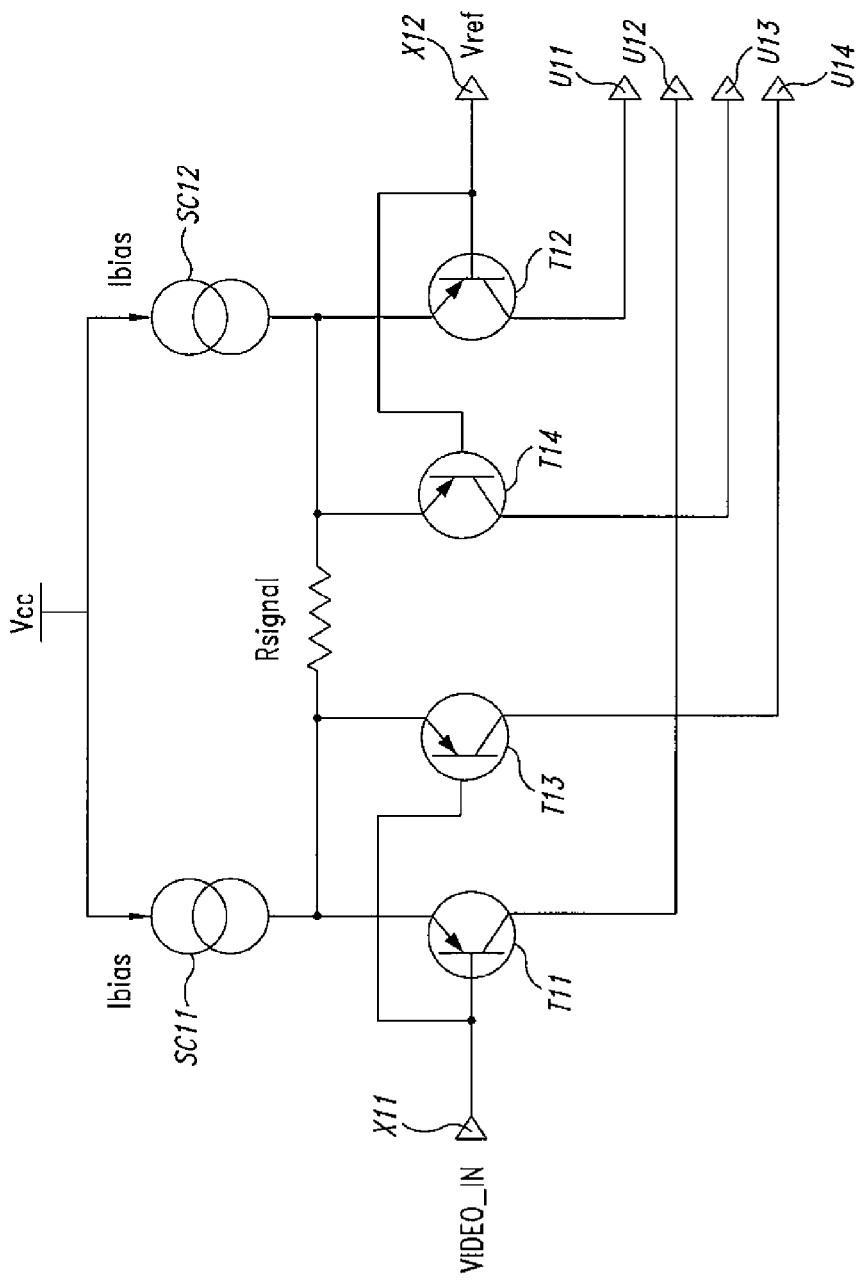

Other characteristics and advantages of the invention will become further apparent on reading the description which follows. The latter is purely illustrative and should be read in conjunction with the appended drawings in which:

FIGS. 1*a*-1*c*, are time charts illustrating various known functions for improving a video image;

FIGS. 2*a*-2*c*, are time charts illustrating a known technique for implementing the differentiation-based sharpness improvement function;

FIGS. 3*a*-3*d*, are time charts illustrating a known technique for implementing the delay line-based sharpness improvement function;

FIG. 4 is a schematic diagram of a circuit for processing a video signal incorporating a device according to the invention;

FIGS. 5*a*-5*d* are time charts illustrating a technique of implementing the integration-based sharpness improvement function, according to the invention;

FIG. 6 is a simplified diagram of one embodiment of a device according to the invention;

FIGS. 7*a*-7*c* are time charts illustrating a sharpness improvement signal produced by a device according to FIG. 6;

FIG. 8 is a simplified diagram of one control stage for the device according to FIG. 6; and, FIGS. 9*a*-9*c* are time charts illustrating a sharpness improvement signal produced by a device according to FIG. 6, with furthermore black level clipping by virtue of the control by a stage according to FIG. 8.

DETAILED DESCRIPTION OF THE INVENTION

In certain applications, in particular for computers (screen of a computer monitor), it is desirable to improve the quality of the display for certain screen zones in which still or moving images are displayed, with respect to other zones of the screen where text data or icons are displayed. For this purpose, display parameters such as the contrast, the brightness and the sharpness or vivacity of the image are modified. In particular, for the displaying of photographs or film sequences, it is preferable to increase the values of the contrast, brightness and/or sharpness in order to ensure better photographic rendition. It will be noted that the values of these parameters should be increased only in the zones in question, so as not to make it difficult or tiring for the eyes to read the text data or icons displayed in the remainder of the screen.

FIG. 4 is a schematic diagram of one embodiment for processing a video signal VIDEO_IN, implementing the image improvement functions presented in the introduction, with regard to FIGS. 1*a*-1*c*. Such a device is for example included in a video preamplification circuit which is generally arranged just upstream of the screen.

The circuit comprises an input 1, for receiving the video signal VIDEO_IN to be processed. This signal has for example the profile represented in FIG. 1*a*. It is typically an R, G or B signal for an application to a computer monitor fitted with a CRT screen.

The circuit can also comprise one or more inputs such as the input 2, for receiving commands for adjusting the brightness, contrast, and/or sharpness (amplitude and/or time constant of the sharpness peak).

The circuit further comprises an input 3, for receiving an image improvement control signal PBC. This signal typically has the profile represented in FIG. 1*b*.

Finally the circuit comprises an output 4 for delivering the output video signal VIDEO_OUT. This signal has for example the profile represented in FIG. 1*c*.

The circuit comprises an input stage 10, a stage for generating a sharpness improvement signal 20, a stage for generating a contrast improvement signal 30, a stage for generating a brightness improvement signal 40, and a video amplification stage or output stage 50. The stages 10 to 30 are stages of transconductance type (voltage/current converters). The stage 50 is a transimpedance stage (current/voltage converter). The inputs of all these stages are designated by the letter X followed by a number, and their outputs are designated by the letter U followed by a number.

Thus, the stage 10 comprises a voltage input X11, two differential current outputs U11 and U12, and two other differential current outputs U13 and U14. The stage 20 comprises a voltage input X21, a control input X22 and two differential current inputs X23 and X24. The stage 30 comprises a voltage input X31, a control input X32, two differential current outputs U31 and U32, and two other differential current outputs U33 and U34. The stage 40 comprises a control input X41, two differential current outputs U41 and U42, and two other differential current outputs U43 and U44. And the stage 50 comprises two differential current inputs X51 and X52, and a voltage output U51.

The output U51 of the stage 50 is coupled to the output 4 of the circuit, to deliver the signal VIDEO_OUT.

The inputs X11, X21 and X31 of the stages 10, 20 and 30 respectively, are coupled to the input 1 of the circuit for receiving the signal VIDEO_IN. The inputs X22, X32 and X41, of the stages 20, 30 and 40 respectively, are coupled to the input 2 of the circuit for receiving an adjustment command. For the sake of simplicity, a single control input 2 is represented, this control being common to the aforesaid stages. However, it is of course understood that the circuit can comprise several such control inputs, in particular at least one for each stage respectively, so that the sharpness (amplitude and/or time constant of the sharpness peak), the contrast and the brightness may be adjusted independently of one another.

The inputs X23 and X24 of the stage 20 are respectively coupled to the outputs U13 and U14 of the stage 10, and also to the outputs U33 and U34 of the stage 30, and also to the outputs U43 and U44 of the stage 40. As will be set forth in greater detail hereinbelow, the inputs X23 and X24 of the stage 20 thus receive a control signal for a bias current, in the form of a differential current, an additive contribution of which is afforded by each of the stages 10, 30 and 40 respectively.

The outputs U11 and U12 of the stage 10 are respectively linked to the inputs X51 and X52 of the stage 50. The outputs U21 and U22 of the stage 20, the outputs U31 and U32 of the stage 30, and the outputs U41 and U42 of the stage 40, are respectively linked to the inputs X51 and X52 of the stage 50 via a two-way switch 60. In an open position of the switch 60, the inputs X51 and X52 of the stage 50 receive only the currents delivered by the outputs U11 and U12 respectively of the stage 10. However in a closed position of the switch 60, they receive, additively, the currents delivered by the outputs U11 and U12 respectively of the stage 10, the outputs U21 and U22 respectively of the stage 20, the outputs U31 and U32 respectively of the stage 30, and the outputs U41 and U42 respectively of the stage 40. A control input of the switch 60 is linked to the input 3 of the circuit for receiving the image improvement control signal PBC, so that its open or closed position is controlled by this signal. In one example corresponding to the present embodiment, the closed position of the switch 60 (respectively open) is obtained for a signal PBC in the high state (respectively low state).

As will have been understood, there are several paths for processing the signal VIDEO_IN. A main path or serial path, corresponding to the open position of the switch 60 (that is with no image improvement functions), passes through the stages 10 and 50 only. Three parallel paths, corresponding to the closed position of the switch 60 (that with image improvement functions), add the processing of the stages 20, 30 and 40 to the processing performed by the stage 10 of the main path, the whole being subjected to the processing of the stage 50.

The fact that each image improvement function, namely the improvement of the sharpness, the improvement of the contrast and the improvement of the brightness, is carried out by a differential transconductance stage 20, 30 and 40 respectively, connected in parallel with the main path, affords a certain number of advantages. Specifically, these stages 20, 30 and 40 add a differential signal at the input of the stage 50 only when the image improvement functions are active (signal PBC in the high state).

The parallel configuration makes it possible in particular not to increase the noise on the main path, with respect to a series arrangement of stages working on voltages.

Moreover, this parallel configuration makes it possible to minimize the consumption of current and hence the heat dissipation problems. Specifically, the supply to the stages 20, 30 and 40 can be completely cut when the signal PBC is in the low state, while a series arrangement of stages working on voltages would require at the minimum the maintaining of a bias voltage of these stages.

A third advantage is related to the differential structure of the stages 20, 30 and 40, and resides in the good performance in terms of noise made possible by this structure.

In what follows, only the operation of the stage 20 is described in detail, and that of stage 10 is described only as far as is necessary to understand the operation of stage 20. Specifically, the invention pertains solely to the implementation of the sharpness improvement function, and the description of the implementation of the other image improvement functions is not required here.

The time charts of FIGS. 5a-5d illustrate the principle of the implementation of the sharpness improvement function according to the invention. This principle and these time charts should be compared with what was presented in the introduction with regard to FIGS. 2a-2c and 3a-3d.

Figure 5A:
Figure 5B:
Figure 5C:
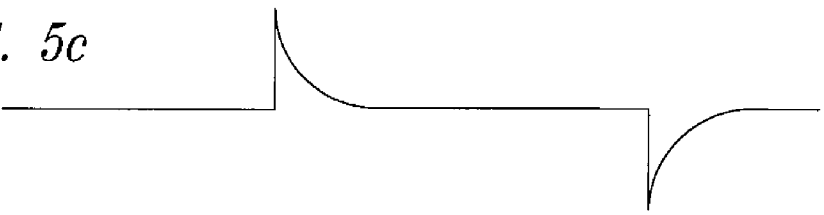
Figure 5D:
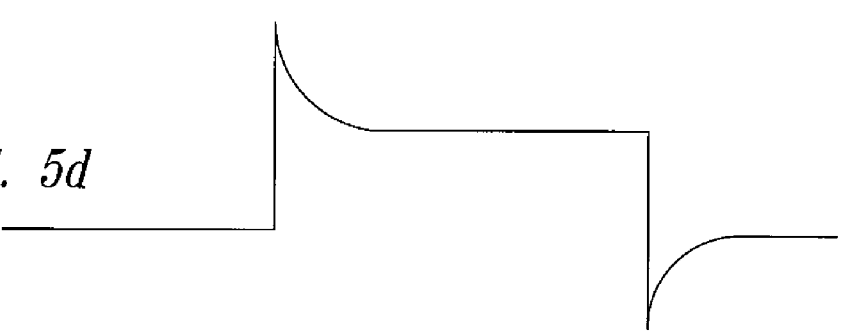

For the sake of simplicity, the signal VIDEO_IN is here again considered in a portion in which it exhibits the form of a rectangular voltage pulse, as is visible in FIG. 5a. The principle of the invention consists in integrating the signal VIDEO_IN so as to obtain the integrated signal VIDEO_IN which is represented in FIG. 5b. Then, the difference is computed between the signal VIDEO_IN and the integrated signal VIDEO_IN, so as to obtain a sharpness improvement signal as represented in FIG. 5c. Finally, the addition of the sharpness improvement signal to the signal VIDEO_IN gives the signal represented in FIG. 5d, this corresponding to the signal VIDEO_OUT without the addition of contrast and brightness improvement signals.

The device according to the invention, one embodiment of which will now be described, has as function to produce a sharpness improvement signal as represented in FIG. 5c, with, further, the implementation of a black level clipping function.

The diagram of FIG. 6 illustrates this embodiment. Stage 20 which is represented therein comprises a differential pair arranged between the voltage input X21, which receives the signal VIDEO_IN, and the current outputs U21 and U22, which deliver currents DOC21 and DOC22 respectively, the difference of which corresponds to the sharpness improvement signal.

This differential pair comprises a transistor T21 and a transistor T22, for example bipolar transistors, and in particular of PNP type. The transistors T21 and T22 have a control electrode (base) coupled to the input X21. The base of T22 is coupled to the input X21 via an integrator INT.

The integrator INT comprises for example a cell RC with a resistor in series R followed by a capacitor C in parallel with an earth terminal.

A first main electrode (emitter) of the transistors T21 and T22 is coupled to a positive supply terminal delivering a voltage Vcc, via a controlled current source, SC21 and SC22 respectively. These current sources each deliver one and the same current Imax. The currents Imax bias the differential pair.

A resistor Rtrans is connected between the respective emitters of the transistors T21 and T22.

The outputs U21 and U22 are coupled to the second main terminal (collector) of the transistors T21 and T22 respectively.

Of course, the embodiment of the stage 20 described hereinabove is not limiting. In particular, a dual embodiment based on a pair of NPN type bipolar transistors is conceivable. Likewise, embodiments based on a pair of MOS transistors, either of N type or of P type, are also conceivable. These, and other embodiments may readily be deduced by a person skilled in the art from the foregoing.

The operation of the stage 20 will now be described in conjunction with the time charts of FIGS. 7a-7c. Initially, the assumption is made that the current Imax is constant.

Represented in FIG. 7a is a portion of the signal VIDEO_IN. For the sake of simplicity, it is assumed that in this portion the signal VIDEO_IN exhibits the profile of a rectangular voltage pulse, between a zero voltage and a determined voltage V1.

Represented in FIG. 7b is the corresponding profile of the currents DOC21 and DOC22 delivered by the current outputs U21 and U22 respectively of the stage 20, in a first case where the current Imax is greater than V1/Rtrans.

At equilibrium, that is for a stable voltage VIDEO_IN, the current in each branch of the differential pair is equal to Imax, that is DOC1=DOC2=Imax. Through the effect of the integrator INT, the current DOC21 exhibits however a negative peak on the rising edge of the signal VIDEO_IN and a positive peak on the falling edge of the signal. Conversely, the current DOC22 exhibits a positive peak on the rising edge of the signal VIDEO_IN and a negative peak on the falling edge of this signal. The amplitude of these peaks is equal to Imax±V1/Rtrans. These are exponentially decaying peaks, with a time constant equal to R×C.

The sharpness improvement signal, which consists of the difference between the differential currents DOC22 and DOC21, therefore exhibits a positive peak of maximum amplitude equal to 2×V1/Rtrans on the rising edge of the signal VIDEO_IN (corresponding to the sharpness peak) and a negative peak of maximum amplitude equal to −2×V1/Rtrans on the falling edge of the signal VIDEO_IN. Advantageously, the amplitude of the sharpness peak is therefore controlled solely by the value of the resistor Rtrans. And its time constant is determined by the value of the hardware items R and C of the integrator INT.

Advantageously, a command for adjusting the maximum amplitude or the time constant of the sharpness peak can therefore act respectively on the value of Rtrans (for the maximum amplitude), or on the value of R and/or of C (for the time constant). Such a command is for example received on the adjustment control input X22 of the stage 20, which input is not represented on the diagram of FIG. 6 so as not to overburden this figure.

Represented in FIG. 7c is the corresponding profile of the currents DOC21 and DOC22, in a second case where the current Imax is less than the V1/Rtrans.

At equilibrium, we still have the relation DOC1=DOC2=Imax. However, the current in the differential pair being limited by design to 2×Imax, it is noted that here the currents DOC21 and DOC22 are clipped at Imax±Imax, that at 0 for the negative peaks and at 2×Imax for the positive peaks. Stated otherwise, the sharpness improvement signal, which corresponds to the difference between the differential currents DOC22 and DOC21, therefore exhibits a positive peak of maximum amplitude limited to 2×Imax on the rising edge of the signal VIDEO_IN and a negative peak of amplitude limited to −2×Imax on the falling edge of the signal VIDEO_IN.

Advantageously, the invention uses this natural clipping effect for the implementation of the clipping of the video signal at the black level. For this purpose, the invention proposes that the value of the bias current Imax of the stage 20 be controlled, as a function of the active component of the signal VIDEO_IN. More exactly, the current Imax is controlled in a manner proportional to the active component of the signal VIDEO_IN, so that there is no clipping in respect of the positive peaks and that there is conversely black level clipping in respect of the negative peaks of the sharpness improvement signal.

This implementation will now be described in detail with regard to the diagram of FIG. 8.

Before tackling this description, it is appropriate firstly to note that the black level does not correspond, in general, to a zero value of the signal VIDEO_IN. Specifically, for reasons of bias of the electronic processing circuits, this signal comprises a non-zero fixed component, called Vref in what follows, which corresponds to the black level and an active component called ΔV in what follows, which carries the video information proper. For simplicity, only the active component of the signal VIDEO_IN has been taken into account in the foregoing. Stated otherwise, in the foregoing it was considered that the fixed component Vref of the signal VIDEO_IN was zero, this not being the case in practice. Typically, Vref is of the order of 1.0 volts and ΔV varies between 0 and 1.0 volts (peak-to-peak).

In what follows, we consider a signal VIDEO_IN such that:

$$\text{VIDEO\_IN} = \text{Vref} + \Delta V \qquad (1)$$

where Vref designates the fixed component of the signal VIDEO_IN, and where ΔV designates the active component of the signal VIDEO_IN.

Represented diagrammatically in FIG. 8 is one embodiment of the stage 10.

This stage comprises, between the voltage input X11 and the current outputs U11 and U12, a differential pair with a first transistor T11 and a second transistor T12. It also comprises, between the input X11 and the current outputs U13 and U14, another differential pair with a first transistor T13 and a second transistor T14.

The transistors T11-T14 are for example bipolar transistors, in particular of PNP type. They each comprise a control electrode (base) coupled to the input X11, for receiving the signal VIDEO_IN. A first main electrode (emitter) of the transistors T11 and T13 is coupled to a positive supply terminal delivering the voltage Vcc, via a controlled current source SC11. Likewise, the emitter of the transistors T12 and T14 is coupled to said positive supply terminal, via a controlled current source SC12. The current sources SC11 and SC12 each deliver one and the same current Ibias. The currents Ibias bias the differential pairs T11-T12 and T13-T14.

A resistor Rsignal is connected between the emitters of the transistors T11 and T13 on the one hand, and the emitters of the transistors T12 and T14 on the other hand. The value of this resistor Rsignal is less than or equal to the resistance Rtrans of stage 20. Advantageously, provision may be made for Rsignal≤Rtrans, preferably $$Rsignal \le \frac{1}{2} \times Rtrans,$$

for example $$Rsignal = \frac{1}{2} \times Rtrans$$

The outputs U11 to U12 are coupled to the second main terminal (collector) of the transistors T11 and T12 respectively. Likewise, the outputs U13 and U14 are coupled to the collector of the transistors T13 and T14 respectively.

Of course, the embodiment of stage 10 described hereinabove is not limiting. In particular, a dual embodiment based on a pair of NPN-type bipolar transistors is conceivable.

Likewise, embodiments based on a pair of MOS transistors, either of N type or P type, are also conceivable. These other embodiments may readily be deduced by the person skilled in the art from the foregoing.

The outputs U11 and U12 deliver currents DOC11 and DOC12 respectively. The differential current between the outputs U11 and U12 is equal to the difference between the currents DOC11 and DOC12. If the assumption is made that the currents Ibias distribute equitably between the transistors T11 and T13 (i.e., in the absence of offset), then this differential current is equal to $$\frac{Ibias}{2} \pm \frac{\Delta V}{2 \times Rsignal}.$$

Its maximum amplitude is therefore equal to $$\frac{\Delta V}{Rsignal}.$$

Likewise, the outputs U13 and U14 deliver currents DOC13 and DOC14 respectively. The differential current between the outputs U13 and U14 is equal to the difference between the currents DOC13 and DOC14. If the same assumption as above is made, then the differential current is also equal to $$\frac{Ibias}{2} \pm \frac{\Delta V}{2 \times Rsignal},$$

and its maximum amplitude is also equal to $$\frac{\Delta V}{Rsignal}.$$

In practice, it may be necessary to obtain differential currents between the outputs U11 and U12 on the one hand, and between the outputs U13 and U14 on the other hand, which have different respective maximum amplitudes.

This result may be achieved by placing an unequal number of bipolar transistors in parallel with the transistors T11 and T12 on the one hand, and with the transistors T13 and T14 on the other hand. This amounts to multiplying the currents DOC11 and DOC12 on the one hand, and the currents DOC13 and DOC14 on the other hand, by non-identical coefficients.

When the transistors T11-T14 are MOS transistors, it is possible to obtain a result of the same nature (introduction of a ratio N between the currents DOC11 and DOC12 on the one hand, and the currents DOC13 and DOC14 on the other hand), by providing for a ratio N between the size (channel width) of the transistors T11 and T12 on the one hand, and the size of the transistors T13 and T14 on the other hand.

The stage 10 is coupled to stage 20, for example via a current mirror arrangement (not represented), in such a way that the following relation holds:

$$Imax = \frac{1}{2} \times \Delta V / Rsignal$$

Stated otherwise, there is provision for the bias current Imax of the differential pair T21-T22 of stage 20 to be proportional to the active component ΔV of the signal VIDEO_IN, and, more particularly, equal to half of the differential current signal between the current outputs U11 and U12 of the stage 10.

This current mirror arrangement can be integrated with stage 20, for example. For example, it may take the form of a transimpedance stage, having two differential current inputs linked to the current inputs X23 and X24 of the stage 20 (see FIG. 4), and a voltage output that controls the current sources SC21 and SC22 of the stage 20, when these sources are voltage controlled. The embodying of such an assembly is within the scope of the person skilled in the art and will not be detailed here.

The operation of stage 20, when it is coupled to stage 10 in the manner just described, will now be described in conjunction with the time charts of FIGS. 9a-9c.

Represented in FIG. 9a, which should be compared with the time charts of FIGS. 2a, 3a and 7a, is the active component ΔV of the signal VIDEO_IN for a determined portion of this signal.

For the sake of simplicity, it is assumed that in this portion the signal VIDEO_IN exhibits the profile of a rising voltage step, between the voltage Vref corresponding to the black level and a determined voltage Vref+V1 followed by a falling voltage step, between said voltage Vref+V1 and another determined voltage Vref+V2, where V2<V1. Stated otherwise, the component ΔV exhibits the values 0, V1 and V2 successively.

Represented in FIG. 9b is the corresponding profile of the currents DOC21 and DOC22 delivered by the current outputs U21 and U22 respectively of stage 20. Represented in FIG. 9c is the sharpness improvement signal, which corresponds to the difference between these two currents, namely the differential current DOC22-DOC21. The curves of FIG. 9b are to be compared with those of FIGS. 7b and 7c, by distinguishing three time domains that are labelled in the figure by numbers 1 to 3 in small circles, and which are associated with the three values of the current Imax(ΔV), namely Imax(0), then Imax(V1), and finally Imax(V2).

Firstly, when ΔV=0, the current Imax is equal to Imax(0), which is equal to 0. The currents DOC21 and DOC22 are equal to Imax(0), the differential pair T21-T22 being balanced, and their difference DOC22-DOC21 is zero.

Secondly, when ΔV=V1, the current Imax(V1) is equal to V1/(2×Rsignal). At the time of the first voltage step, the currents DOC21 and DOC22 exhibit a peak (with exponential decay) respectively negative and positive, the maximum amplitude of which is equal to Imax(V1)±V1/Rtrans and the time constant of which is equal to R×C, since the differential pair T21-T22 is unbalanced by the rising edge of the signal VIDEO_IN. The difference DOC22-DOC21 between the currents DOC22 and DOC21 is non-zero. In fact this difference is a positive peak whose maximum amplitude is equal to 2×V1/Rtrans, and whose time constant is equal to R×C. The condition V1/Rtrans≦Imax(V1) that V1/Rtrans≦V1/Rsignal being satisfied with $$Imax(V1) = \frac{1}{2} \times V1/Rsignal \text{ and } Rsignal \leq \frac{1}{2} \times Rtrans,$$

there is no clipping.

Stated otherwise, it is by providing that the bias currents Imax of the stage 20 be greater than the input signal's active component converted into current (that ΔV/Rtrans) that the absence of clipping is guaranteed. This arrangement is satisfactory when $$Imax = \frac{1}{2} \times \Delta V/Rsignal \text{ and when } Rsignal \leq \frac{1}{2} \times Rtrans.$$

Thirdly, when ΔV=V2, the current Imax(V2) is equal to V2/(2×Rsignal). At the time of the second voltage step, the differential pair T21-T22 is unbalanced by the falling edge of the signal VIDEO_IN, so that the currents DOC21 and DOC22 exhibit a peak respectively positive and negative, the maximum amplitude of which is equal to Imax(V2)± (V1-V2)/Rtrans and the time constant of which is equal to $$\frac{1}{2} \times R \times C.$$

The difference DOC22-DOC21 between the currents DOC22 and DOC21 is non-zero. This difference ought to correspond to a negative peak whose maximum amplitude would be equal to −2×(V1-V2)/Rtrans. Nevertheless, the condition (V1-V2)/Rtrans≦Imax(V2) not being satisfied with $$Imax(V2) = \frac{1}{2} \times V2/Rsignal \text{ and } Rsignal = \frac{1}{2} \times Rtrans,$$

there is clipping of the currents DOC22 and DOC21, so that their difference is at most equal to −2×Imax(V2) that to −V2/Rsignal. Hence, the sharpness improvement signal cannot have an amplitude which is less than that of the signal VIDEO_IN's active component converted into current ΔV/Rtrans, this amounting to black level clipping (ΔV=0).

The fact that the bias currents Imax vary as a function of the active component ΔV of the signal VIDEO_IN does not affect the sharpness improvement signal itself, outside of course of the black level clipping that is sought. Specifically, this signal corresponds to the difference between the currents DOC22 and DOC21, and this difference is not affected by the variations in the currents Imax, except as regards the clipping.

It will be noted that problems of compensation of the offset between the transistors of the differential pairs and of speed of the control of the sources of bias current of these differential pairs are resolved by any means appropriate on behalf of the person skilled in the art.

It will also be noted that the level of the clipping depends of course on the improvement in contrast and brightness. It is for this reason that the current mirror arrangement generating the commands for the sources SC21 and SC22 additively integrates differential currents emanating from the stages 30 and 40 in addition to stage 10.

The invention claimed is:

1. A device for producing a sharpness improvement signal for a video image while providing black level clipping of an associated video signal, said device comprising:
   a first differential transconductance stage having:
   a voltage input for receiving the video signal, said video signal having a determined fixed component which corresponds to the black level and a variable active component;
   a differential pair with a first transistor having a control terminal coupled to the voltage input, and a second transistor having a control terminal coupled to the voltage input via an integrator;
   a first controlled current source coupled to a first main terminal of the first transistor and a second controlled current source coupled to a first main terminal of the second transistor, said first current source and said second current source each delivering one and the same variable bias current
   a resistor connected between said first respective main terminals of the first and of the second transistor;
   a first current output coupled to a second main terminal of the first transistor and a second current output coupled to a second main terminal of the second transistor, the sharpness improvement signal being the differential current signal between said first and second current outputs; and
   means for producing a control signal for the first and for the second current source, in such a way that the bias currents are directly proportional to the active component of the video signal.

2. Device according to claim 1, further comprising an input for receiving a control signal for the maximum amplitude or for the time constant of a sharpness peak, by acting respectively on the value of the resistor or on the value of the hardware items of the integrator.

3. Device according to claim 1, wherein the means for producing a control signal comprise a differential transconductance stage comprising:
   a second differential transconductance stage comprising:
   a voltage input for receiving the video signal;
   a first differential pair with a first transistor having a control terminal coupled to the voltage input, and a second transistor having a control terminal receiving a DC voltage corresponding to the fixed component of the video signal,
   a first controlled current source coupled to a first main terminal of the first transistor and a second controlled current source coupled to a first main terminal of the second transistor, said first current source and said second current source each delivering one and the same fixed bias current,
   a resistor connected between said first respective main terminals of the first and of the second transistor;
   a first current output coupled to a second main terminal of the first transistor and a second current output coupled to a second main terminal of the second transistor, the control signal for the first and for the second current source of the first differential transconductance stage being such that the bias current of the first differential transconductance stage is equal to half of the differential current signal between said first and second current outputs.

4. Device according to claim 3, wherein the second differential transconductance stage further comprises:
   a second differential pair with a first transistor having a control terminal coupled to the voltage input, and a second transistor having a control terminal receiving a DC voltage corresponding to the fixed component of the video signal, a first main terminal of the first transistor of the first pair, and a first main terminal of the second transistor being coupled to the first main terminal of the second transistor of the first pair, a third current output coupled to a second main terminal of said first transistor and a fourth current output being coupled to a second main terminal of said second transistor, the sharpness improvement signal being adapted for being added to the differential current signal between said third and fourth current outputs.

5. Device according to claim 4, wherein the differential currents between the first and second current outputs on the one hand, and between the third and fourth current outputs on the other hand, have different respective maximum amplitudes.

6. Device according to claim 4, wherein the first differential transconductance stage and the second differential transconductance stage are coupled by a current mirror arrangement receiving as input the differential current signal between said first and second current outputs of the first differential pair of the second differential transconductance stage, and delivering as output the control signal for the first and for the second current source of the first differential transconductance stage.

7. Device according to claim 6, wherein the current mirror arrangement is included in the first differential transconductance stage.

8. A video preamplification circuit comprising a device according to claim 1.

9. A device comprising:
a first signal adjustment stage having an integrator configured to receive an input video signal at a first input node of the first signal adjustment stage and to output an integrated video signal to a second input node of the first signal adjustment stage; and
a second signal adjustment stage configured to output a bias signal to the first signal adjustment stage, the bias signal being at least partially determined by the input video signal and affecting black level clipping of a video adjustment signal, the video adjustment signal corresponding to the difference of the input video signal and the integrated video input signal.

10. The device according to claim 9 wherein the first signal adjustment stage comprises a first differential pair.

11. The device according to claim 10 wherein the second signal adjustment stage comprises a second differential pair.

12. The device according to claim 11 comprising:
a first control resistor coupled between a first and a second branch of the first differential pair, the first control resistor being configured to affect the amplitude of the video adjustment signal; and
a second control resistor coupled between a first and a second branch of the second differential pair, the second control resistor being configured to affect the amplitude of the bias signal.

13. The device according claim 12 wherein the input video signal comprises:
a fixed dc voltage component; and
a variable voltage component.

14. The device according to claim 13 wherein the second differential pair receives the input video signal on a first control node, and the second differential pair receives the fixed dc voltage component on a second control node.

15. A method for adjusting an input video signal, the method comprising:
supplying an input video signal to an input node of an integrator connected to a first control node of a first signal adjustment stage;
outputting an integrated video signal from an output of the integrator to a second control node of the first signal adjustment stage;
supplying the input video signal to a second signal adjustment stage;
outputting a bias signal from the second signal adjustment stage to the first signal adjustment stage, the bias signal being at least partially determined by the input video signal; and
determining a video adjustment signal that includes black level clipping, the video adjustment signal corresponding to a difference between the input video signal and the integrated video signal.

16. The method of claim 15 comprising adding the video adjustment signal to the input video signal to obtain an output video signal.

17. The method of claim 15 wherein the first signal adjustment stage comprises a first differential pair.

18. The method of claim 17 wherein the second signal adjustment stage comprises a second differential pair.

19. The method of claim 18 wherein a first control resistor is coupled between a first and a second branch of the first differential pair, the first control resistor being configured to affect the amplitude of the video adjustment signal.

20. The method of claim 19 wherein a second control resistor is connected between a first and a second branch of the second differential pair, the second control resistor being configured to affect the amplitude of the bias signal.

* * * * *